(12) United States Patent
Schwabe

(10) Patent No.: US 7,158,993 B1
(45) Date of Patent: Jan. 2, 2007

(54) API REPRESENTATION ENABLING SUBMERGED HIERARCHY

(75) Inventor: Judith E. Schwabe, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 87 days.

(21) Appl. No.: 09/662,258

(22) Filed: Sep. 14, 2000

Related U.S. Application Data

(60) Provisional application No. 60/165,298, filed on Nov. 12, 1999, provisional application No. 60/165,533, filed on Nov. 15, 1999.

(51) Int. Cl.
*G06F 17/30* (2006.01)

(52) U.S. Cl. ................. 707/103 R; 707/101; 707/102; 707/104.1; 717/126; 717/154; 715/513

(58) Field of Classification Search .................... 707/1, 707/103, 101, 102, 103 R, 104.1; 717/163, 717/165, 108, 116, 118, 126, 154; 709/328; 715/513
See application file for complete search history.

(56) References Cited

U.S. PATENT DOCUMENTS

| | | | |
|---|---|---|---|
| 5,022,028 A | 6/1991 | Edmonds et al. | 714/38 |
| 5,313,616 A | 5/1994 | Cline et al. | 717/127 |
| 5,408,665 A * | 4/1995 | Fitzgerald | 717/163 |
| 5,446,901 A | 8/1995 | Owicki et al. | |
| 5,490,249 A | 2/1996 | Miller | |
| 5,565,316 A | 10/1996 | Kershaw et al. | 434/322 |
| 5,613,101 A | 3/1997 | Lillich | |
| 5,615,137 A | 3/1997 | Holzmann et al. | 364/578 |
| 5,652,835 A | 7/1997 | Miller | |
| 5,668,999 A | 9/1997 | Gosling | |

(Continued)

FOREIGN PATENT DOCUMENTS

EP  0 292 248  5/1988

(Continued)

OTHER PUBLICATIONS

Zhao, Jianjun "Applying Program Dependence Analysis to Java Software" Fukuoka Kogyo Daigaku Kenkyu Ronshu (Research Bulletin of Fukuoka Institute of Technology), vol. 31, No. 1, pp. 29-41. 1998.*

(Continued)

*Primary Examiner*—Thuy N. Pardo
(74) *Attorney, Agent, or Firm*—Gunnison, McKay & Hodgson, L.L.P.; Forrest Gunnison

(57) ABSTRACT

A method for representing an application programming interface (API) for an object-oriented library includes creating a list of public elements in the library and storing the list. Each public element in the list includes a sublist of all public related elements for the element. According to one aspect, the public elements include classes and interfaces, the public related elements include public superclasses and public superinterfaces, and the library is a Java™ package. According to one aspect, a method for determining a program hierarchy includes receiving an API definition file for an object-oriented library and indicating a first public element is a direct parent of a second public element when the first public element is represented in the sublist for the second public element and the first public element is not represented in the sublist for any other public element listed in the sublist for the second public element. According to another aspect, a method for detecting changes to a program hierarchy includes comparing a first program hierarchy reconstructed from a first API definition file with a second program hierarchy reconstructed form a second API definition file and indicating an error when the first program hierarchy is inconsistent with the second program hierarchy.

20 Claims, 10 Drawing Sheets

```
165
public class Object
    superclasses = <none>
public class C1                    170
    superclasses = Object
public class C3                    175
    superclasses = C1, Object
public class C2                    180
    superclasses = C3, C1, Object
```

U.S. PATENT DOCUMENTS

| | | | |
|---|---|---|---|
| 5,701,408 | A | 12/1997 | Cornell et al. |
| 5,724,272 | A | 3/1998 | Mitchell et al. ............ 702/123 |
| 5,737,609 | A * | 4/1998 | Reed et al. ................. 717/126 |
| 5,748,964 | A | 5/1998 | Gosling ....................... 395/705 |
| 5,748,980 | A | 5/1998 | Lipe et al. ...................... 710/8 |
| 5,761,510 | A | 6/1998 | Smith, Jr. et al. |
| 5,884,316 | A | 3/1999 | Bernstein et al. |
| 5,907,704 | A * | 5/1999 | Gudmundson et al. ..... 717/100 |
| 5,925,140 | A | 7/1999 | Hudson ........................ 714/52 |
| 5,966,702 | A | 10/1999 | Fresko et al. ................... 707/1 |
| 5,974,255 | A * | 10/1999 | Gossain et al. ............. 717/124 |
| 5,999,731 | A | 12/1999 | Yellin et al. ................ 395/704 |
| 6,002,871 | A | 12/1999 | Duggan et al. |
| 6,011,918 | A * | 1/2000 | Cohen et al. ................ 717/106 |
| 6,016,495 | A * | 1/2000 | McKeehan et al. ..... 707/103 R |
| 6,038,378 | A | 3/2000 | Kita et al. |
| 6,052,732 | A | 4/2000 | Gosling |
| 6,058,393 | A | 5/2000 | Meier et al. |
| 6,067,639 | A | 5/2000 | Rodrigues et al. |
| 6,075,940 | A | 6/2000 | Gosling |
| 6,092,147 | A | 7/2000 | Levy et al. |
| 6,125,442 | A * | 9/2000 | Maves et al. ............... 712/220 |
| 6,138,112 | A | 10/2000 | Slutz |
| 6,178,504 | B1 | 1/2001 | Fieres et al. ................ 713/164 |
| 6,182,158 | B1 | 1/2001 | Kougioris et al. |
| 6,202,070 | B1 | 3/2001 | Nguyen et al. .......... 707/104.1 |
| 6,205,579 | B1 | 3/2001 | Southgate ................... 717/173 |
| 6,212,633 | B1 | 4/2001 | Levy et al. |
| 6,230,312 | B1 | 5/2001 | Hunt |
| 6,230,314 | B1 * | 5/2001 | Sweeney et al. ............ 717/108 |
| 6,230,318 | B1 * | 5/2001 | Halstead et al. ............ 717/108 |
| 6,243,859 | B1 * | 6/2001 | Chen-Kuang ............... 717/111 |
| 6,247,171 | B1 | 6/2001 | Yellin et al. |
| 6,263,492 | B1 * | 7/2001 | Fraley et al. ............... 717/107 |
| 6,272,674 | B1 | 8/2001 | Holiday, Jr. |
| 6,347,398 | B1 | 2/2002 | Parthasarathy et al. ..... 717/178 |
| 6,349,344 | B1 | 2/2002 | Sauntry et al. |
| 6,360,334 | B1 | 3/2002 | Kavanagh et al. ............ 714/38 |
| 6,363,488 | B1 | 3/2002 | Ginter et al. ................ 713/201 |
| 6,370,541 | B1 * | 4/2002 | Chou et al. ............. 707/103 X |
| 6,370,686 | B1 | 4/2002 | Delo et al. |
| RE37,722 | E * | 5/2002 | Burnard et al. ............. 345/764 |
| 6,389,467 | B1 | 5/2002 | Eyal ........................... 709/223 |
| 6,405,309 | B1 | 6/2002 | Cheng et al. ................... 713/1 |
| 6,418,554 | B1 | 7/2002 | Delo et al. |
| 6,425,118 | B1 | 7/2002 | Molloy et al. .............. 717/136 |
| 6,427,227 | B1 | 7/2002 | Chamberlain ............... 717/124 |
| 6,434,744 | B1 | 8/2002 | Chamberlain et al. ...... 717/168 |
| 6,466,947 | B1 | 10/2002 | Arnold et al. |
| 6,477,666 | B1 | 11/2002 | Sanchez et al. |
| 6,477,702 | B1 | 11/2002 | Yellin et al. ................ 717/126 |
| 6,519,767 | B1 | 2/2003 | Carter et al. |
| 6,526,571 | B1 * | 2/2003 | Aizikowitz et al. ......... 717/154 |
| 6,539,539 | B1 | 3/2003 | Larsen et al. |
| 6,546,551 | B1 * | 4/2003 | Sweeney et al. ............ 717/154 |
| 6,549,930 | B1 | 4/2003 | Chrysos et al. |
| 6,651,186 | B1 | 11/2003 | Schwabe ...................... 714/38 |
| 6,668,289 | B1 | 12/2003 | Cheng et al. ................. 710/36 |
| 6,708,324 | B1 | 3/2004 | Solloway et al. ........... 717/124 |
| 6,721,941 | B1 | 4/2004 | Morshed et al. ............ 717/127 |
| 6,742,177 | B1 | 5/2004 | Dorak et al. ................ 717/124 |
| 6,748,555 | B1 | 6/2004 | Teegan et al. ................ 714/38 |
| 6,986,101 | B1 * | 1/2006 | Cooper et al. .............. 715/513 |
| 2002/0040936 | A1 | 4/2002 | Wentker et al. |

FOREIGN PATENT DOCUMENTS

| | | |
|---|---|---|
| EP | 0 498 130 A2 | 12/1991 |
| EP | 0 685 792 A1 | 5/1995 |
| EP | 0 718 761 A1 | 12/1995 |
| EP | 0 778 520 | 11/1996 |
| EP | 0 778 520 A2 | 11/1996 |
| WO | WO 98/19237 | 5/1998 |
| WO | WO 98/52158 | 5/1998 |
| WO | 98/37526 | 8/1998 |
| WO | WO 00/00890 | 1/2000 |
| WO | WO 00/25278 | 5/2000 |
| WO | WO 00/46666 | 8/2000 |
| WO | WO 01/14958 | 1/2001 |

OTHER PUBLICATIONS

David Basin "Java Bytecode Verification by Model Checking" System Abstract, pp. 492-495 IT-Research Security (TZ/FE34).

Daniels, John et al., "Strategies For Sharing Objects In Distributed Systems", JOOP, *Object Designers Ltd., UK*, pp. 27-36.

Chan, "Infrastructure of Multi-Application Smart Card", http://home.hkstar.com/~alanchan/papers/multiApplicationSmartCard/, Jul. 25, 2002.

Chen, Zhiqun, "Java Card™ Technology for Smart Cards", *Sun Microsystems*, pp. 11-16, Jun. 2000.

Ritchey, Tim, "Advanced Topics: The Java Virtual Machine", *Java!*, Chapter 14, pp. 25-346, Sep. 22, 1995.

Sun Microsystems, Inc., "Java Card™ 2.0 Language Subset and Virtual Machine Specification", Oct. 13, 1997, Revision 1.0 Final.

Sun Microsystems, Inc., "Java Card™ 2.0 Programming Concepts", Oct. 15, 1997, Revision 1.0 Final.

"Sun Delivers On Vision to Bring JAVA Technology to the Consumer and Embedded Market", Business Wire, Sep. 28, 1999.

"Sun Microsystems Announces JAVACARD API", Business Wire, Oct. 1996.

Sun Microsystems: "Sun's JAVA Technology Leads Open Worldwide Market for Smart Cards", M2, Presswire, May 1999.

Posegga et al., "*Byte Code Verification for Java Smart Cards Based on Model Checking*", Sep. 16-18, pp. 175-190.

Necula et al., "*Proof-Carrying Code*", Nov. 1996, pp. 1-60.

Bergin et al., "Java Resources for Computer Science Instruction", *Report of the ITiCSE'98/ACTC'98 Working Group on Curricular Opportunities of Java Based Software Development*, ITiCSE, pp. 14-34 (1998).

Bowles et al., "A Comparison of Commercial Reliability Prediction Programs", *Proceedings Annual Reliability and Maintainability Symposium*, IEEE, pp. 450-455 (1990).

Cooper, Richard, "Persistent Languages Facilitate the Implementation of Software Version Management", *IEEE*, pp. 56-65 (1989).

Ferscha et al., "Java Based Conservative Distributed Simulation", *Proceedings of the 1997 Winter Simulation Conference*, pp. 381-388 (1997).

Foster et al., "A Security Architecture for Computational Grids", *Fifth ACM Conference on Computer & Communications Security*, pp. 83-92 (1998).

Lindsay et al., "A Generic Model for Fine Grained Configuration Management Including Version Control and Traceability", *Proceedings of the Australian Software Engineering Conference (ASWEC'97)*, IEEE Computer Society, pp. 27-36 (1997).

Suresh Subramanian, "*CRUISE: Using Interface Hierarchies to Support Software Evolution*", IEEE, 1988, pp. 132-142.

International Search Report, PCT/US 01/28579, International filing date Sep. 12, 2001, date Search Report mailed- Jan. 5, 2004.

International Search Report, PCT/US 01/28688, International filing date Sep. 14, 2001, date Search report mailed- Jan. 5, 2004.

International Preliminary Examination Report, PCT/US01/28687, International filing date Sep. 14, 2001, date Search Report mailed Jan. 5, 2004.

Czajkowski, Grzegorz et al., "JRes: A Resource Accounting Interface for Java", pp. 21-35, ACM, Vancouver, B.C., 1998.

Ostroff, Jonathan S., "Automated Modular Specification and Verification of Real-Time Reactive Systems", pp. 108-121, IEEE, 1995.

Abdulla, Parosh et al., "Verifying Programs with Unreliable Channels", pp. 160-170, IEEE, 1993.

* cited by examiner

```
                    6
            4     (
             )  )
public class(Object
public class C1 extends Object
public class C2 extends C1
                      (
                       )
                       2
```

FIG. 1A

```
                    12
            14    (
             )  )
public class(Object
public class C1 extends Object
class PrivateClass extends C1
public(class C2 extends PrivateClass
      )      (
      10      )
              8
```

FIG. 1B public class Object
    superclasses = <none>
public class C1 ~~~~~ 58
    superclasses = Object
public class C2 ~~~~~ 56
    superclasses = C1, Object

FIG. 2C public class C1
    superclasses = <none>
public class Object ~~~~~ 64
    superclasses = C1
public class C2 ~~~~~ 66
    superclasses = C1, Object

FIG. 2D

150 public class Object
 superclasses = <none>
public class C1 ——— 155
 superclasses = Object
public class C2 ——— 160
 superclasses = C1, Object

FIG. 5A

165 public class Object
 superclasses = <none>
public class C1 ——— 170
 superclasses = Object
public class C3 ——— 175
 superclasses = C1, Object
public class C2 ——— 180
 superclasses = C3, C1, Object

FIG. 5B public class C3 extends Object
public class C4 extends C2 — 205

FIG. 6B public class C3
    superclasses = Object — 215
public class C4 — 220
    superclasses = C2, C1, Object

FIG. 6C

API REPRESENTATION ENABLING SUBMERGED HIERARCHY

CROSS REFERENCE TO RELATED APPLICATIONS

This application claims the benefit of provisional patent application Ser. No. 60/165,298 filed Nov. 12, 1999 in the name of inventor Judith E. Schwabe, entitled "API Representation Enabling Submerged Hierarchy". This application also claims the benefit of provisional patent application Ser. No. 60/165,533 filed Nov. 15, 1999 in the name of inventor Judith E. Schwabe, entitled "API Representation Enabling Submerged Hierarchy".

This application is related to the following:

U.S. Patent Application filed Sep. 14, 2000 in the name of inventor Judith E. Schwabe, entitled "Remote Incremental Program Verification Using API Definitions", Ser. No. 09/662,503, commonly assigned herewith.

U.S. Patent Application filed Sep. 14, 2000 in the name of inventor Judith E. Schwabe, entitled "Remote Incremental Program Binary Compatibility Verification Using API Definitions", Ser. No. 09/661,684, commonly assigned herewith.

U.S. Patent Application filed Sep. 14, 2000 in the name of inventor Judith E. Schwabe, entitled "Populating Resource-Constrained Devices With Content Verified Using API Definitions", Ser. No. 09/661,582, commonly assigned herewith.

U.S. Patent Application filed Sep. 14, 2000 in the name of inventor Judith E. Schwabe, entitled "Populating Binary Compatible Resource-Constrained Devices With Content Verified Using API Definitions", Ser. No. 09/661,582, commonly assigned herewith.

U.S. patent application Ser. No. 09/243,108 filed Feb. 2, 1999 in the name of inventors Judith E. Schwabe and Joshua B. Susser, entitled "Token-based Linking".

BACKGROUND OF THE INVENTION

1. Field of the Invention

The present invention relates to computer systems. More particularly, the present invention relates to a method for representing an application programming interface (API) in an object-oriented system such that submerged hierarchies are enabled.

2. Background

An API definition file typically defines a library of functionality that may be used by one or more client applications in an object-oriented system. An API definition file also typically includes the set of classes and interfaces that are externally accessible from that library and the items in those classes and interfaces that are externally accessible. A library in Java™ technology corresponds to the Java™ "Package" construct.

The "items" in classes and interfaces include fields, methods and implemented interfaces of the various classes, and fields and methods of the various interfaces. Additionally, the immediate superclass and superinterface for each class and interface, respectively, is listed. Since an API can only enumerate externally accessible items, all superclasses and superinterfaces must also be externally accessible.

An API definition file may include non-public functionality that is not exposed by the API definition file. This functionality can be implemented in classes as non-public fields, non-public methods or non-public implemented interfaces. In addition, the content of a method is not disclosed in an API representation, regardless of whether the method is public or non-public. Therefore, non-public algorithms are not disclosed.

FIG. 1A illustrates a typical API representation. In this example, all of the classes in the hierarchy of C2 (2) are public. The API representation indicates that the public class C1 (4) is the superclass of the public class C2 (2). The API representation also indicates that the public class Object (6) is the superclass of the public class C1 (4). Thus, this API representation reveals the entire hierarchy of C2 (2). Furthermore, typical API representations unnecessarily constrain a hierarchy by forcing the hierarchy to contain only public classes.

Additionally, since typical API representations only indicate the immediate superclass or superinterface of a particular class or interface, respectively, one must traverse the hierarchy recursively to determine whether a class or interface is a member of the hierarchy. Such functionality requires that not only the immediate API definition file is available when validating references to elements in a hierarchy, but also the set of API definition files referenced by that API definition file.

The Java™ language supports a construct where the immediate superclass or superinterface of a class or interface, respectively, may be declared as non-public. A superclass or superinterface declared in this way must not be disclosed in an API definition file. FIG. 1B demonstrates this feature in a class hierarchy. Such a hierarchy that includes one or more non-public classes is referred to as a submerged hierarchy. Such constructs are useful to API designers and implementers because they allow non-public, or proprietary functionality to be inserted into a hierarchy and for that functionality to be encapsulated in a hidden class. This provides for modular designs consistent with Object-oriented theory.

However, the hierarchy illustrated in FIG. 1B cannot be represented in a typical API definition file. This is because a typical API representation requires the disclosure of the immediate superclass of C2 (8), which is PrivateClass (10). Disclosing a non-public class such as PrivateClass (10) would violate the Java™ language requirement that such a class not be made public.

Typical API representations constrain the design of an API such that more than is desirable falls into the publicly accessible domain. Accordingly, a need exists in the prior art for an API representation that sufficiently constrains particular implementations, while allowing them to define submerged hierarchies.

SUMMARY OF THE INVENTION

A method for representing an application programming interface (API) for an object-oriented library includes creating a list of public elements in the library and storing the list. Each public element in the list includes a sublist of all public related elements for the element. According to one aspect, the public elements include classes and interfaces, the public related elements include public superclasses and public superinterfaces, and the library is a Java™ package. According to one aspect, a method for determining a program hierarchy includes receiving an API definition file for an object-oriented library and indicating a first public element is a direct parent of a second public element when the first public element is represented in the sublist for the second public element and the first public element is not represented in the sublist for any other public element listed in the sublist for the second public element. According to another aspect, a method for detecting changes to a program hierarchy includes comparing a first program hierarchy reconstructed from a first API definition file with a second program hierarchy reconstructed form a second API definition file and indicating an error when the first program hierarchy is inconsistent with the second program hierarchy.

BRIEF DESCRIPTION OF THE DRAWINGS

FIG. 1A is a representation of a typical hierarchy as disclosed in a typical Application Programming Interface (API) representation.

FIG. 1B is a representation of a typical hierarchy including a submerged hierarchy.

FIG. 2C is an API representation of a hierarchy in accordance with one embodiment of the present invention.

FIG. 2D is an API representation in accordance with one embodiment of the present invention, demonstrating a change from the hierarchy as shown in FIG. 2C.

FIG. 5A is an API definition file in accordance with one embodiment of the present invention, representing the hierarchy of FIG. 4A.

FIG. 5B is an API definition file in accordance with one embodiment of the present invention, representing the hierarchy of FIG. 4B.

FIG. 6B is a representation of a client API definition that references the API definition illustrated in FIG. 6A.

FIG. 6C is an API definition file in accordance with one embodiment of the present invention, representing the hierarchy in FIG. 6B.

DETAILED DESCRIPTION OF THE PREFERRED EMBODIMENTS

Those of ordinary skill in the art will realize that the following description of the present invention is illustrative only. Other embodiments of the invention will readily suggest themselves to such skilled persons having the benefit of this disclosure.

This invention relates to computer systems. More particularly, the present invention relates to an API representation enabling a submerged hierarchy in an object-oriented system. The invention further relates to machine-readable media on which are stored (1) the layout parameters of the present invention and/or (2) program instructions for using the present invention in performing operations on a computer. Such media includes by way of example magnetic tape, magnetic disks, optically readable media such as CD ROMs and semiconductor memory such as PCMCIA cards. The medium may also take the form of a portable item such as a small disk, diskette or cassette. The medium may also take the form of a larger or immobile item such as a hard disk drive or a computer RAM.

According to embodiments of the present invention, API class hierarchies are specified such that submerged hierarchies are supported while sufficiently constraining particular API implementations such that each API implementation is functionally equivalent and the operations available to clients of each API implementation are exactly equivalent.

Figure 2A:
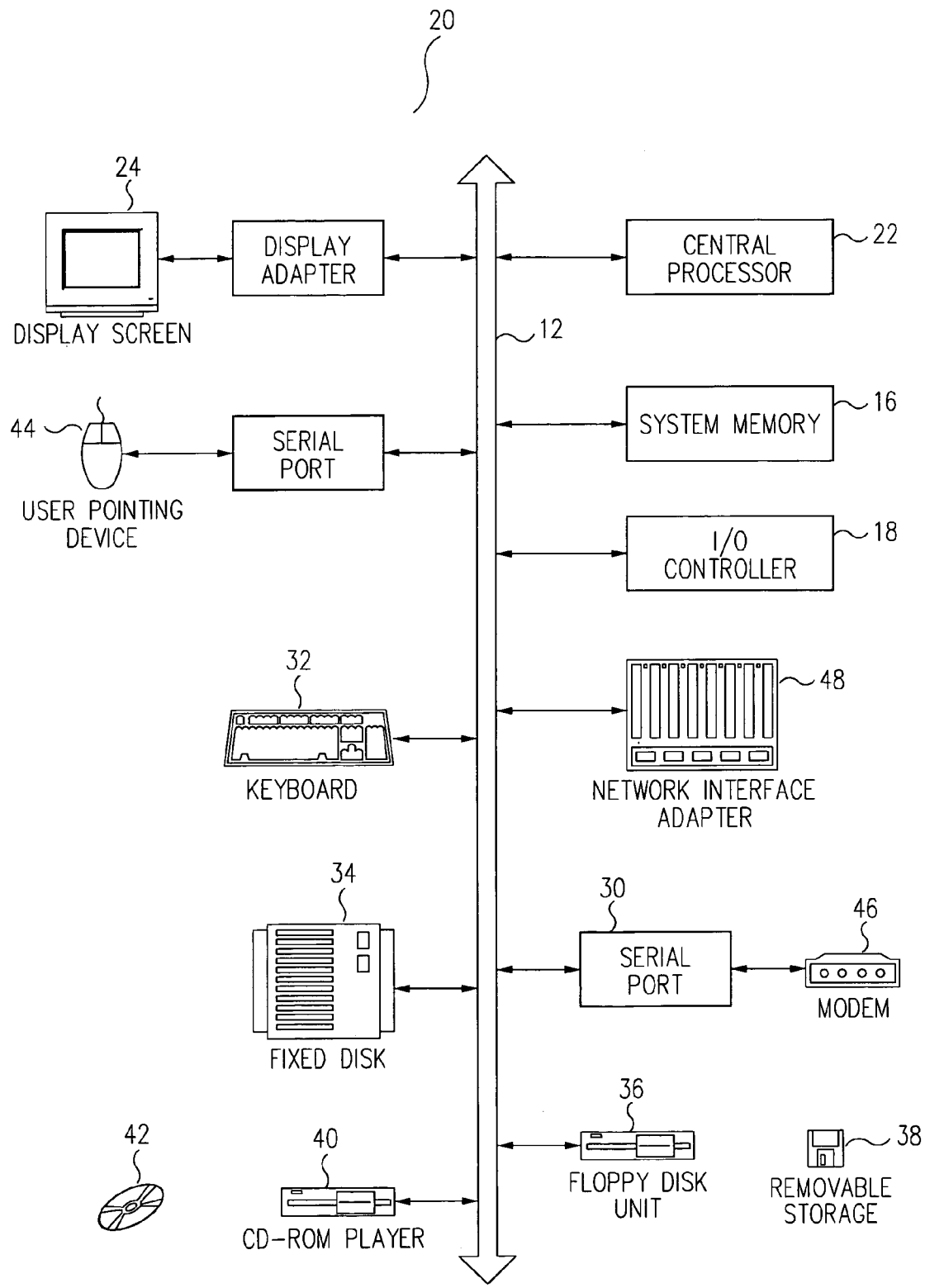
FIG. 2A is a block diagram of a computer system suitable for implementing aspects of the present invention.

FIG. 2A depicts a block diagram of a computer system 20 suitable for implementing aspects of the present invention. As shown in FIG. 2A, computer system 20 includes a bus 12 which interconnects major subsystems such as a central processor 22, a system memory 16 (typically RAM), an input/output (I/O) controller 18, an external device such as a display screen 24 via display adapter 26, serial ports 28 and 30, a keyboard 32, a fixed disk drive 34, a floppy disk drive 36 operative to receive a floppy disk 38, and a CD-ROM player 40 operative to receive a CD-ROM 42. Many other devices can be connected, such as a pointing device 44 (e.g., a mouse) connected via serial port 28 and a modem 46 connected via serial port 30. Modem 46 may provide a direct connection to a remote server via a telephone link or to the Internet via a POP (point of presence). Alternatively, a network interface adapter 48 may be used to interface to a local or wide area network using any network interface system known to those skilled in the art (e.g., Ethernet, DSL, AppleTalk™).

Many other devices or subsystems (not shown) may be connected in a similar manner. Also, it is not necessary for all of the devices shown in FIG. 2A to be present to practice the present invention, as discussed below. Furthermore, the devices and subsystems may be interconnected in different ways from that shown in FIG. 2A. The operation of a computer system such as that shown in FIG. 2A is readily known in the art and is not discussed in detail in this application, so as not to overcomplicate the present discussion. Code to implement the present invention may be operably disposed in system memory 16 or stored on storage media such as fixed disk 34 or floppy disk 38.

Figure 2B:
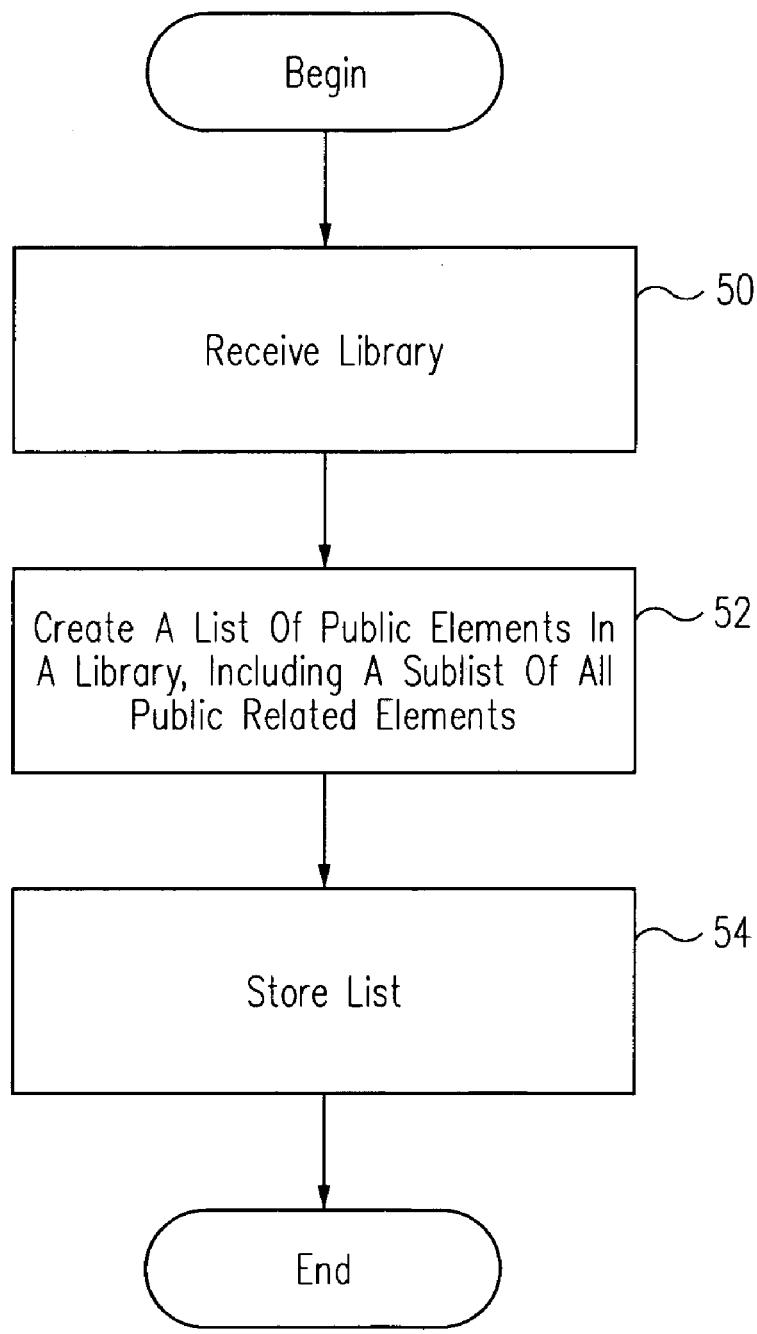
FIG. 2B is a flow diagram that illustrates a method for representing an API definition in accordance with one embodiment of the present invention.

Turning now to FIG. 2B, a flow diagram that illustrates creating an API definition file in accordance with one embodiment of the present invention is presented. At 50, a library is received. At 52, a list of public elements in the library is created. The list of public elements includes a sublist of all public related elements. Each sublist of public related elements includes public elements that are directly related and public elements that are indirectly related. Examples of public elements that are directly and indirectly related are illustrated with reference to FIG. 2C. At 54, the list is stored.

Turning now to FIG. 2C, an API representation in accordance with one embodiment of the present invention is presented. The API representation shown in FIG. 2C can be used to represent the hierarchies illustrated in FIGS. 1A and 1B. In this representation, the hierarchy of each public class is defined using a list of the public superclasses. Thus, the hierarchy for public class C2 (56) is the list of pubic superclasses (C1, Object). The hierarchy for public class C1 is (Object) and the hierarchy for public class Object (60) is the empty set, since Object (60) has no superclass. Note that private class (10) in FIG. 1B is not disclosed in the API representation of FIG. 2C.

Given the API representation of the present invention, the hierarchy can be reconstructed. For example, the hierarchy of FIG. 1A can be reconstructed from the representation illustrated in FIG. 2C as follows. Starting with public class C2 (56), the representation or list of superclasses for C2 (56) indicates C2 (56) has superclasses C1 (58) and Object (60). Therefore, either C1 (58) or Object (60) is a direct superclass of C2 (56). Since the representation for the hierarchy of C1 (58) also indicates Object (60) is a superclass of C1 (58), C1 (58) is the direct superclass of C2 (56) and Object (60) is the direct superclass of C1 (58). Determining a program hierarchy is discussed in more detail with reference to FIG. 3A.

Figure 3A:
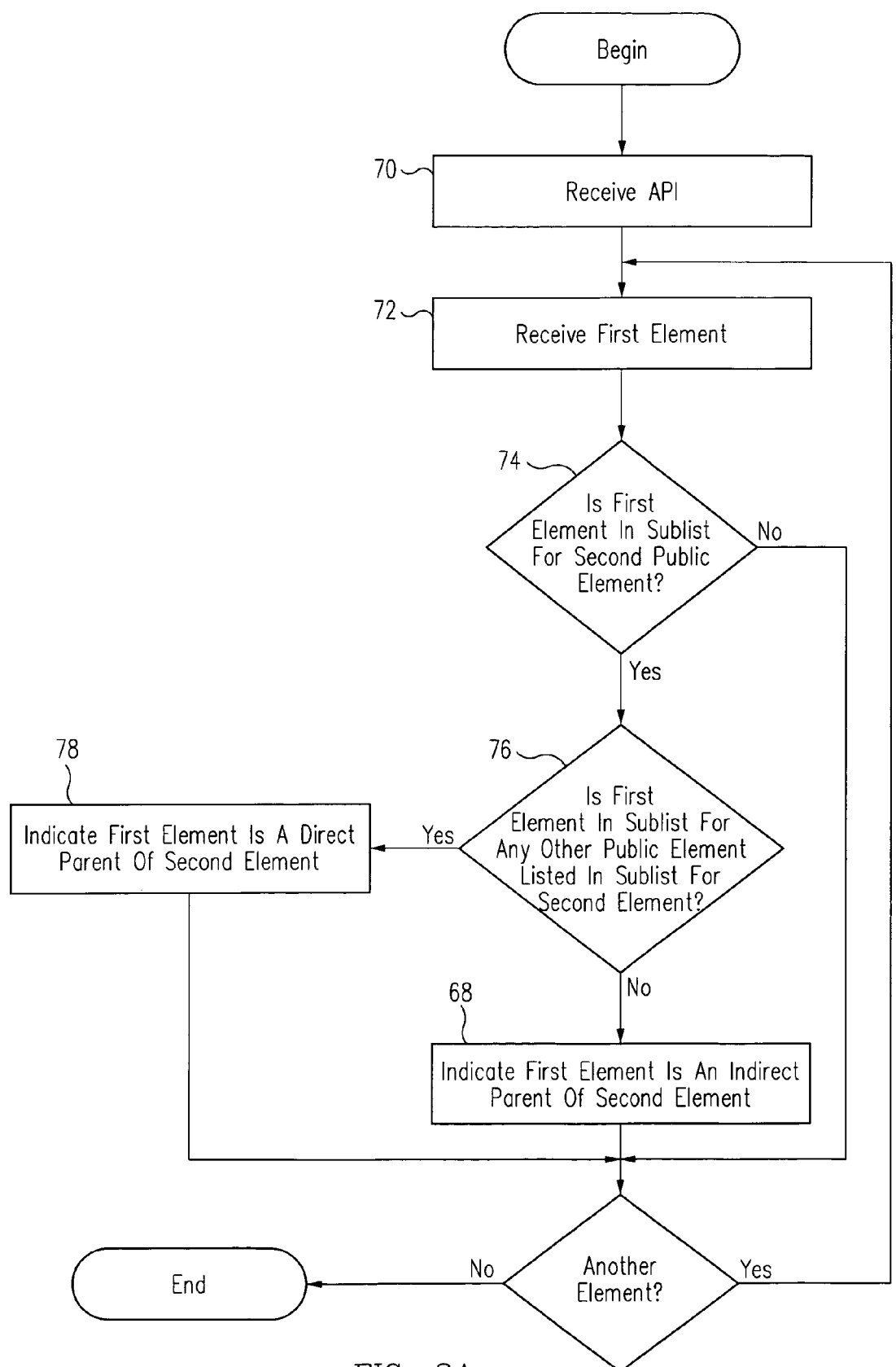
FIG. 3A is a flow diagram that illustrates determining a program hierarchy based on an API in accordance with one embodiment of the present invention.

Turning now to FIG. 3A, a method for determining a program hierarchy based on an API definition file in accordance with one embodiment of the present invention is presented. At 70, an API definition file is received. At 72, a first public element in the API definition file is received. At 74, a determination is made regarding whether the first public element is in a sublist for a second public element in the API definition file. If the public element is not in a sublist within the API definition file, the public element is not a parent of any other element in the API definition file. If the public element is in a sublist for another element, at 76, a check is made to determine whether the first public element is in a sublist for any other public element listed in the sublist of the second public element. If the answer at 76 is "Yes", at 78, an indication is made that the first public element is a direct parent of the second element. If the answer at 76 is "No", at 68, an indication is made that the first element is an indirect parent of the second element. This process continues at 72 until all public elements in the API definition file have been examined.

Figures 3B, 3C:
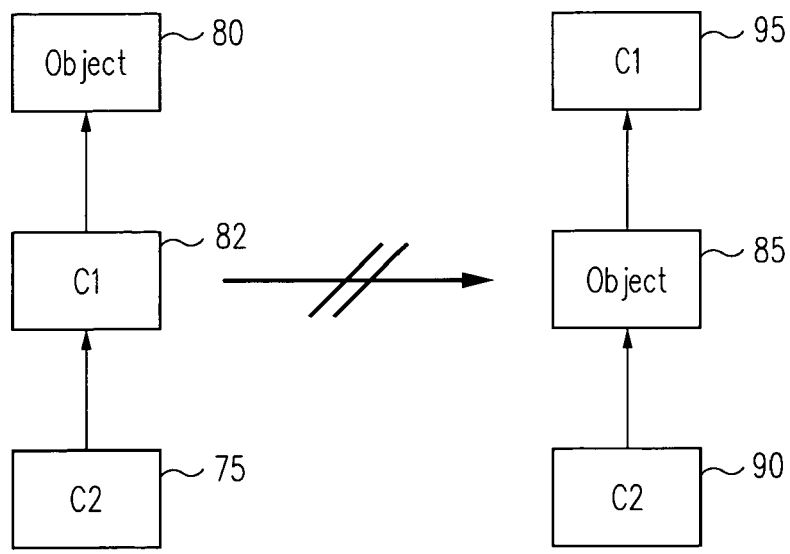
FIG. 3B is a class diagram that illustrates the hierarchy represented by the API in FIG. 2C.
FIG. 3C is a class diagram that illustrates the hierarchy represented by the API in FIG. 3C.

The API representation illustrated by FIG. 2C sufficiently constrains particular implementations from changing the order of classes in a hierarchy. This is illustrated in FIGS. 2C–3C. FIG. 3B shows an initial hierarchy including three classes, C2 (75), C1 (82) and Object (80). The class C2 (75) extends class C1 (82) and C1 (82) extends Object (80). FIG. 2C illustrates an API representation of the hierarchy in FIG. 3B according to one embodiment of the present invention. According to one embodiment of the present invention, each class includes a list of all superclasses, both direct and indirect. Thus, class C2 (56) includes enough information regarding its superclasses to reconstruct the hierarchy represented in FIG. 3B from C2 (75) up through Object (80). Likewise, class C1 (58) includes enough information to reconstruct the hierarchy from C1 (82) up to Object (80).

Once the hierarchy is reconstructed, relationships inconsistent with the original hierarchy can be detected. FIG. 3C represents an attempt to change the initial hierarchy of FIG. 3B by switching the relationship between Object (80) and C1 (82). FIGS. 2C and 2D are API representations in accordance with the present invention, corresponding to FIGS. 3B and 3C, respectively. Those of ordinary skill in the art will recognize that the API representation in FIG. 2C is not equal to the API representation in FIG. 2D.

Since the present invention allows the hierarchy represented by FIG. 3B to be reconstructed based on the API representation, any attempt to switch the relationship between the classes can be detected. For example, the reconstructed hierarchy created from the API representation in FIG. 2C indicates that neither C1 (58) nor C2 (56) is a superclass of Object (60), and that C2 (56) is not a superclass of C1 (58). However, the reconstructed hierarchy created from the API representation in FIG. 2D indicates that C1 (62) is a superclass of Object (64). Since the hierarchical relationships extracted from the API representations in FIGS. 2C and 2D are inconsistent, an attempt to change the relationships of the classes in FIG. 3B is indicated.

Figures 4A, 4B:
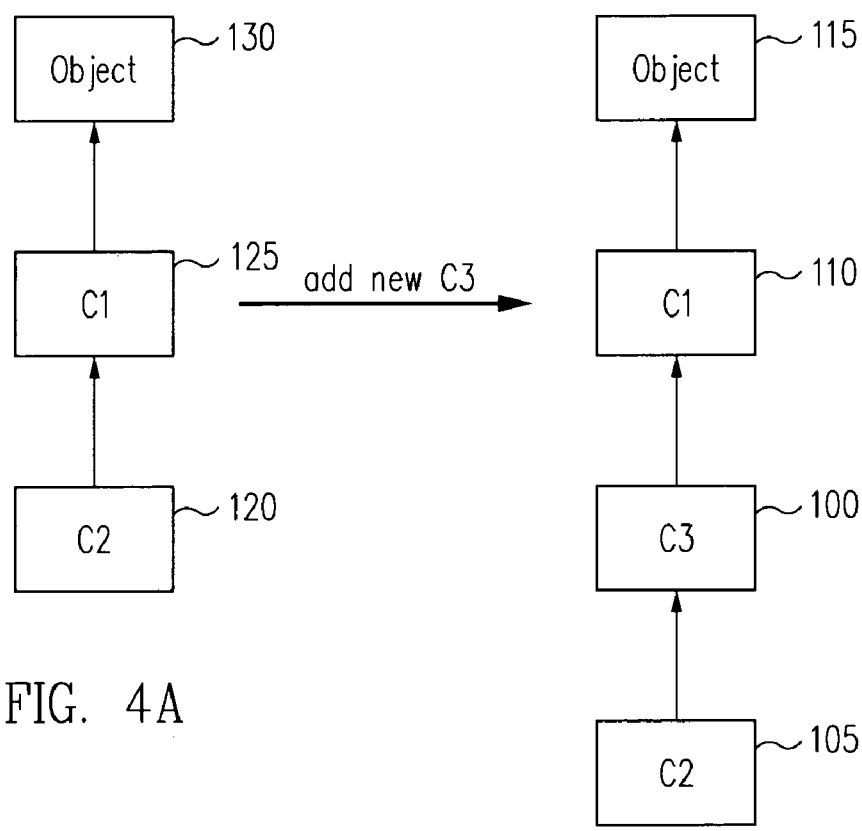
FIG. 4A is a class diagram that illustrates a class hierarchy.
FIG. 4B is a class diagram that illustrates adding a class to the hierarchy of FIG. 4A.

Furthermore, adding or removing a publicly accessible class from a hierarchy results in a different API representation. The effect of adding a publicly accessible class is illustrated in FIGS. 4A–5B. FIG. 4A illustrates an initial hierarchical relationship. FIG. 4B illustrates the hierarchy that results after a new publicly accessible class C3 (100) is added to the hierarchy illustrated in FIG. 4B. FIGS. 5A and 5B are API representations of the hierarchies in FIGS. 4A and 4B, respectively. The list of superclasses for C2 (160, 180) differs in FIGS. 5A and 5B. Specifically, the list of superclasses for C2 (160) in FIG. 5A includes C1 (155) and Object (150). The list of superclasses for C2 (180) in FIG. 5B includes C3 (175), as well as C1 (170) and Object (165). Since the hierarchical relationships extracted from the API representations in FIGS. 5A and 5B are inconsistent, an attempt to change the relationships of the classes in FIG. 4A is indicated.

Those of ordinary skill in the art will recognize that the effect of removing a publicly accessible class may be detected in a similar manner.

The API representation illustrated by FIG. 2C also allows hierarchies having submerged hierarchies such as the one illustrated by FIG. 1B to be represented without revealing any non-public or proprietary information about the hierarchy. Thus, the list of superclasses for C2 (8) is (C1, Object), the list of superclasses for C1 (14) is (Object) and the list of superclasses for Object (5) is the empty set. A client of this API definition can use this information to reconstruct the hierarchy of FIG. 1B, without revealing any information about the non-public class PrivateClass (10).

Since a client of an API definition only has access to public items in any particular implementation of the API definition, the existence of a submerged hierarchy does not have any impact on the client. The submerged portion of the hierarchy is non-public and therefore not available to the client. Thus, using the API representation in FIG. 2C, a client can execute with either an implementation of FIG. 1A or FIG. 1B and obtain functionally equivalent results.

A client API definition is an API definition that references another API definition. The API representation of the present invention discloses only those portions of client API definitions relevant to a client in regard to class hierarchies, without requiring complete disclosure of those referenced API definitions. This provides an additional method for keeping dependencies on referenced API definitions undisclosed, while still providing sufficient information to a client of the client API definition.

Figure 6A:
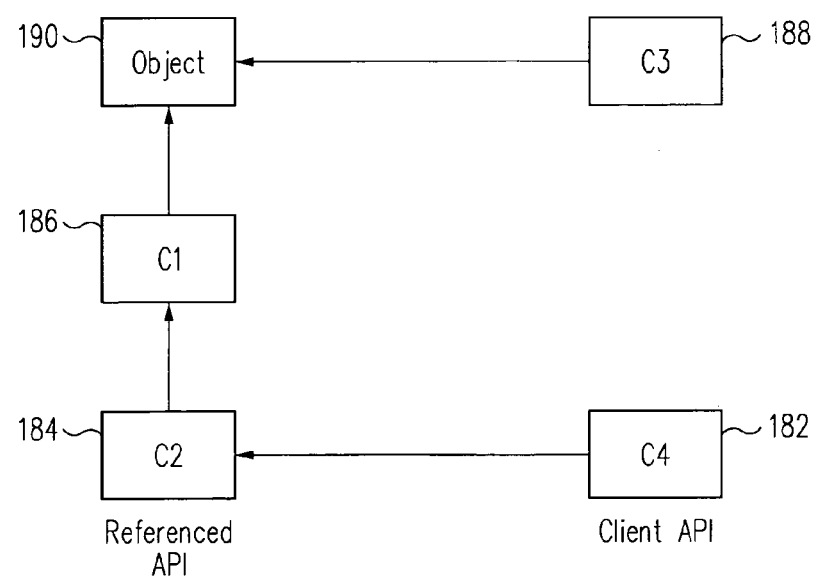
FIG. 6A is a class diagram of an API definition that is extended by a client API definition.

Turning now to FIG. 6A, a class diagram of an API definition that is extended by a client API definition is presented. Client API definition C4 (182) references the API definition containing C2 (184). The API definition containing C2 (184) references class C1 (186). Both class C1 (186) and class C3 (188) reference class Object (190). In this example, C4 (182) of the client API definition extends C2 (184) of the referenced API definition, and class C3 (188) of the client API definition extends class Object (190) of the referenced API definition.

Turning now to FIG. 6B, a representation of a hierarchy that references another hierarchy is presented. Classes Object (200) and C2 (205) are as represented in FIG. 6A.

Turning now to FIG. 6C, an API representation of the hierarchy of FIG. 6B in accordance with one embodiment of the present invention is presented. The API representation includes all direct and indirect superclasses for each class in the client API definition of FIG. 6A. Thus, a client of the API definition in FIG. 6C can determine complete hierarchy information from the client API (182) in FIG. 6A, without requiring complete disclosure of referenced API definition (184) of FIG. 6A.

The present invention also relates to apparatus for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove more convenient to construct more specialized apparatus to perform the required process. The required structure for a variety of these machines will appear from the description given.

While the Java™ programming language and platform are suitable for the invention, any language or platform having certain characteristics would be well suited for implementing the invention. These characteristics include type safety, pointer safety, object-oriented, dynamically linked, and virtual machine based. Not all of these characteristics need to be present in a particular implementation. In some embodiments, languages or platforms lacking one or more of these characteristics may be utilized. Also, although the invention has been illustrated showing object-by-object security, other approaches, such as class-by-class security could be utilized.

The system of the present invention may be implemented in hardware or in a computer program. Each such computer program can be stored on a storage medium or device (e.g., CD-ROM, hard disk or magnetic diskette) that is readable by a general or special purpose programmable computer for configuring and operating the computer when the storage medium device is read by the computer to perform the procedures described. The system may also be implemented as a computer-readable storage medium, configured with a computer program, where the storage medium so configured causes a computer to operate in a specific and predefined manner.

According to a presently preferred embodiment, the present invention may be implemented in software or firmware, as well as in programmable gate array devices, Application Specific Integrated Circuits (ASICs), and other hardware.

Thus, a novel method for representing an API has been described. While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for representing an application programming interface (API) definition for an object-oriented library, said method comprising:

creating a public list including all public classes and interfaces defined in said object-oriented library wherein said all public classes and interfaces being written in an object-orientated computer programming language and said interfaces include methods, said public list including a class sublist for each of said public classes, each said class sublist including all direct and indirect public superclasses of a class and excluding private classes; and storing said list.

2. The method of claim 1 wherein said object-oriented library is a Java™ package.

3. A program storage device readable by a machine, embodying a program of instructions executable by the machine to perform a method to represent an application programming interface (API) definition for an object-oriented library, the method comprising:

creating a public list including all public classes and interfaces defined in said object-oriented library wherein said all public classes and interfaces being written in an object-orientated computer programming language and said interfaces include methods, said public list including a class sublist for each of said public classes, each said class sublist including all direct and indirect public superclasses of a class and excluding private classes; and storing said list.

4. The program storage device of claim 3 wherein said object-oriented library is a Java™ package.

5. An apparatus for representing an application programming interface (API) definition for an object-oriented library, said apparatus comprising:

means for creating a public list including all public classes and interfaces defined in said object-oriented library wherein said all public classes and interfaces being written in an object-orientated computer programming language and said interfaces include methods, said public list including a class sublist for each of said public classes, each said class sublist including all direct and indirect public superclasses of a class and excluding private classes; and means for storing said list.

6. The apparatus of claim 5 wherein said object-oriented library is a Java™ package.

7. A method for representing an application programming interface (API) definition for an object-oriented library, said method comprising:

step for creating a public list including all public classes and interfaces defined in said object-oriented library wherein said all public classes and interfaces being written in an object-orientated computer programming language and said interfaces include methods, said public list including a class sublist for each of said public classes, each said class sublist including all direct and indirect public superclasses of a class and excluding private classes; and step for storing said list.

8. The method of claim 7 wherein said object-oriented library is a Java™ package.

9. A method for determining a program hierarchy, said method comprising:

receiving an application programming interface (API) definition file for an object-oriented library, said API definition file including a list of public elements in said object-oriented library, each element comprising a class or interface, wherein said each class or interface being written in an object-orientated computer programming language and said interface include at least one method each of said public elements including a sublist of all public hierarchically-related elements that are a parent of the element and excluding private classes; and indicating a first public element is a direct parent of a second public element when said first public element is represented in the sublist for said second public element and said first public element is not represented in the sublist for any other public element listed in the sublist for said second public element.

10. The method of claim 9 wherein said object-oriented library is a Java™ package.

11. The method of claim 9, further comprising
comparing a first program hierarchy reconstructed from a first API definition file with a second program hierarchy reconstructed from a second API definition file; and
indicating an error when said first program hierarchy is inconsistent with said second program hierarchy.

12. A program storage device readable by a machine, embodying a program of instructions executable by the machine to perform a method to determine a program hierarchy, said method comprising:
receiving an application programming interface (API) definition file for an object-oriented library, said API definition file including a list of public elements in said object-oriented library, each element comprising a class or interface, wherein said each class or interface being written in an object-orientated computer programming language and said interface include at least one method each of said public elements including a sublist of all public hierarchically-related elements that are a parent of the element and excluding private classes; and
indicating a first public element is a direct parent of a second public element when said first public element is represented in the sublist for said second public element and said first public element is not represented in the sublist for any other public element listed in the sublist for said second public element.

13. The program storage device of claim 12 wherein said object-oriented library is a Java™ package.

14. The program storage device of claim 12, said method further comprising:
comparing a first program hierarchy reconstructed from a first API definition file with a second program hierarchy reconstructed from a second API definition file; and
indicating an error when said first program hierarchy is inconsistent with said second program hierarchy.

15. An apparatus for determining a program hierarchy, said apparatus comprising:
means for receiving an application programming interface (API) definition file for an object-oriented library, said API definition file including a list of public elements in said object-oriented library, each element comprising a class or interface, wherein said each class or interface being written in an object-orientated computer programming language and said interface include at least one method each of said public elements including a sublist of all public hierarchically-related elements that are a parent of the element and excluding private classes; and
means for indicating a first public element is a direct parent of a second public element when said first public element is represented in the sublist for said second public element and said first public element is not represented in the sublist for any other public element listed in the sublist for said second public element.

16. The apparatus of claim 15 wherein said object-oriented library is a Java™ package.

17. The apparatus of claim 15, said apparatus further configured to:
compare a first program hierarchy reconstructed from a first API definition file with a second program hierarchy reconstructed from a second API definition file;
indicate an error when said first program hierarchy is inconsistent with said second program hierarchy.

18. A method for determining a program hierarchy, said method comprising:
step for receiving an application programming interface (API) definition file for an object-oriented library, said API definition file including a list of public elements in said object-oriented library, each element comprising a class or interface, wherein said each class or interface being written in an object-orientated computer programming language and said interface include at least one method each of said public elements including a sublist of all public hierarchically-related elements that are a parent of the element and excluding private classes; and
step for indicating a first public element is a direct parent of a second public element when said first public element is represented in the sublist for said second public element and said first public element is not represented in the sublist for any other public element listed in the sublist for said second public element.

19. The method of claim 18 wherein said object-oriented library is a Java™ package.

20. The method of claim 19, further comprising
step for comparing a first program hierarchy reconstructed from a first API definition file with a second program hierarchy reconstructed from a second API definition file; and
step for indicating an error when said first program hierarchy is inconsistent with said second program hierarchy.

* * * * *